April 13, 1954 F. W. SMITH 2,674,916
VARIABLE QUANTITY EVALUATOR HAVING LIGHT SENSING MEANS
Filed July 26, 1950 2 Sheets-Sheet 1

INVENTOR
*Frederick W. Smith*
BY
ATTORNEY

April 13, 1954 F. W. SMITH 2,674,916
VARIABLE QUANTITY EVALUATOR HAVING LIGHT SENSING MEANS
Filed July 26, 1950 2 Sheets-Sheet 2
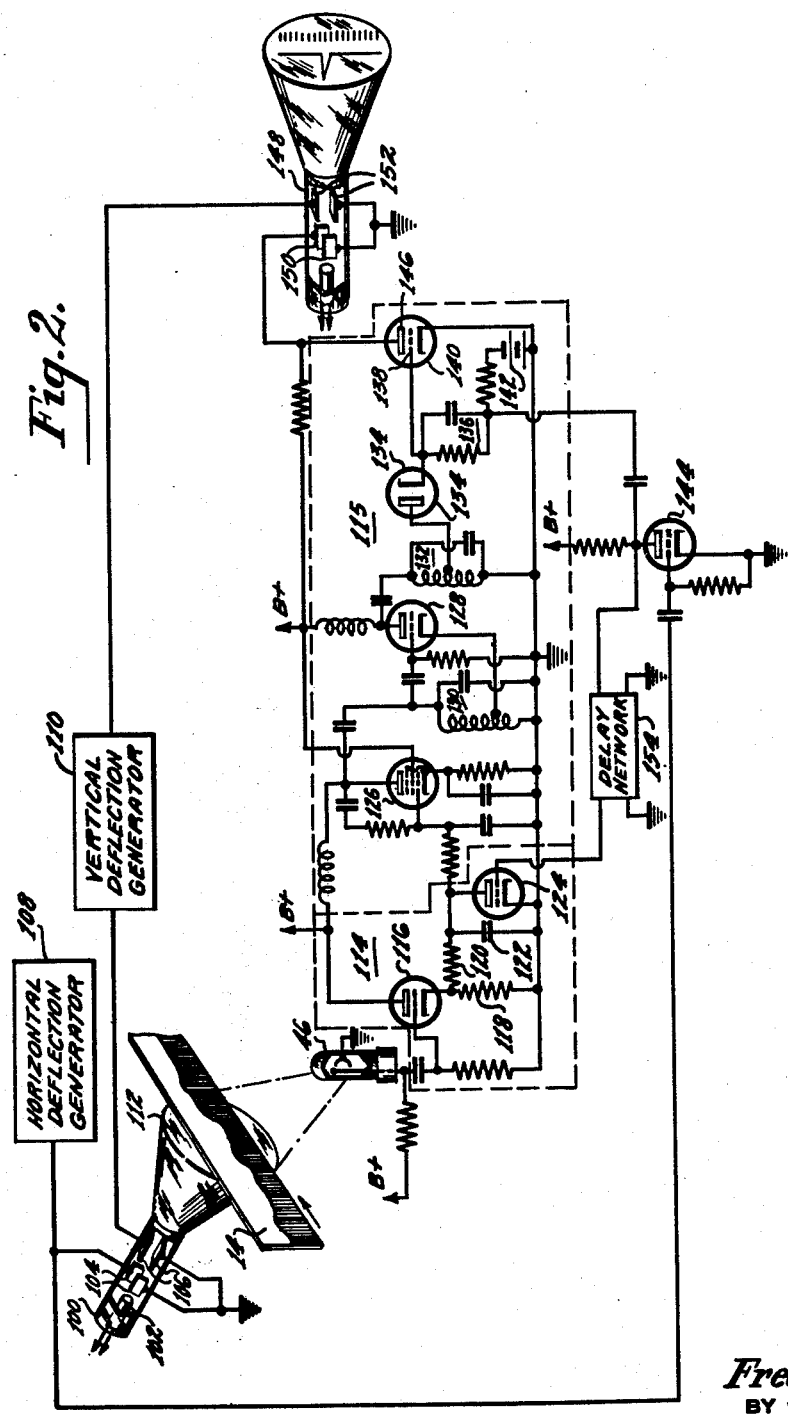
INVENTOR
*Frederick W. Smith*
BY
ATTORNEY Patented Apr. 13, 1954

2,674,916

UNITED STATES PATENT OFFICE 2,674,916

VARIABLE QUANTITY EVALUATOR HAVING LIGHT SENSING MEANS

Frederick W. Smith, Jamaica, N. Y., assignor to Radio Corporation of America, a corporation of Delaware Application July 26, 1950, Serial No. 175,893

2 Claims. (Cl. 88—14)

This invention relates to improvements in apparatus for evaluating variable quantities, and particularly to apparatus for determining the median or other similar arbitrary values of variable quantities.

For the sake of concreteness, the invention will be described with particular reference to the determination of median values of radio wave field intensities. However, it will become obvious as the description proceeds that the invention is not limited to the analysis of radio wave field intensities, nor to the determination of median values. Special reference will be made hereinafter to alternative applications of the principles of the invention.

In the measurement of the field intensity of radio waves, it is usual practice to state the field intensity in terms of median values (see e. g. "Radio propagation variations at VHF and UHF," Proceedings of the Institute of Radio Engineers, January 1950, p. 27). It is, of course, well known that the field intensity of a radio wave may vary either as a function of the distance from the wave source, or as a function of time at any given point relative to the wave source. By median value of field intensity which is exceeded for 50 percent of the time or distance interval under consideration.

It is one object of the present invention to provide apparatus for determining median or other similar arbitrary percentage values automatically, eliminating the many manhours of laborious graphical analysis which are required in present practice.

A further object of the invention is to provide an improved apparatus for evaluating a variable quantity which is recorded as a variable area record. For example, such record may be of the type known in the sound motion picture art as a variable area sound track but of larger scale.

Another object of the invention is the provision of apparatus for making a continuous record of median or similar arbitrary percentage values of a variable quantity.

An ancillary object of the invention is the provision of an electrical circuit capable of distinguishing and responding to a voltage pulse group of predetermined pulse duration.

In accordance with the invention, certain of the foregoing and other related objects of the invention are achieved by directing light onto a predetermined length of a variable area record along a line parallel to the edges of the record (and parallel to the direction in which the record is generated), and measuring the light-absorbing characteristics of that portion (line and length) of the record as a measure of the position of the line on the record. In one embodiment of the invention, evaluation of the record light-absorbing characteristics is accomplished by an optical and electrical system. In another embodiment of the invention, a combined optical and electronic system is disclosed.

A more complete understanding of the invention can be had by reference to the following description of illustrative embodiments thereof, when considered in connection with the accompanying drawings, wherein:

Figure 2 is a view similar to Figure 1 of a modified form of variable quantity analyzer, and Figure 2a shows a waveform of certain of the voltages developed in the analyzer of Fig. 2.

Figures 1, 1A:
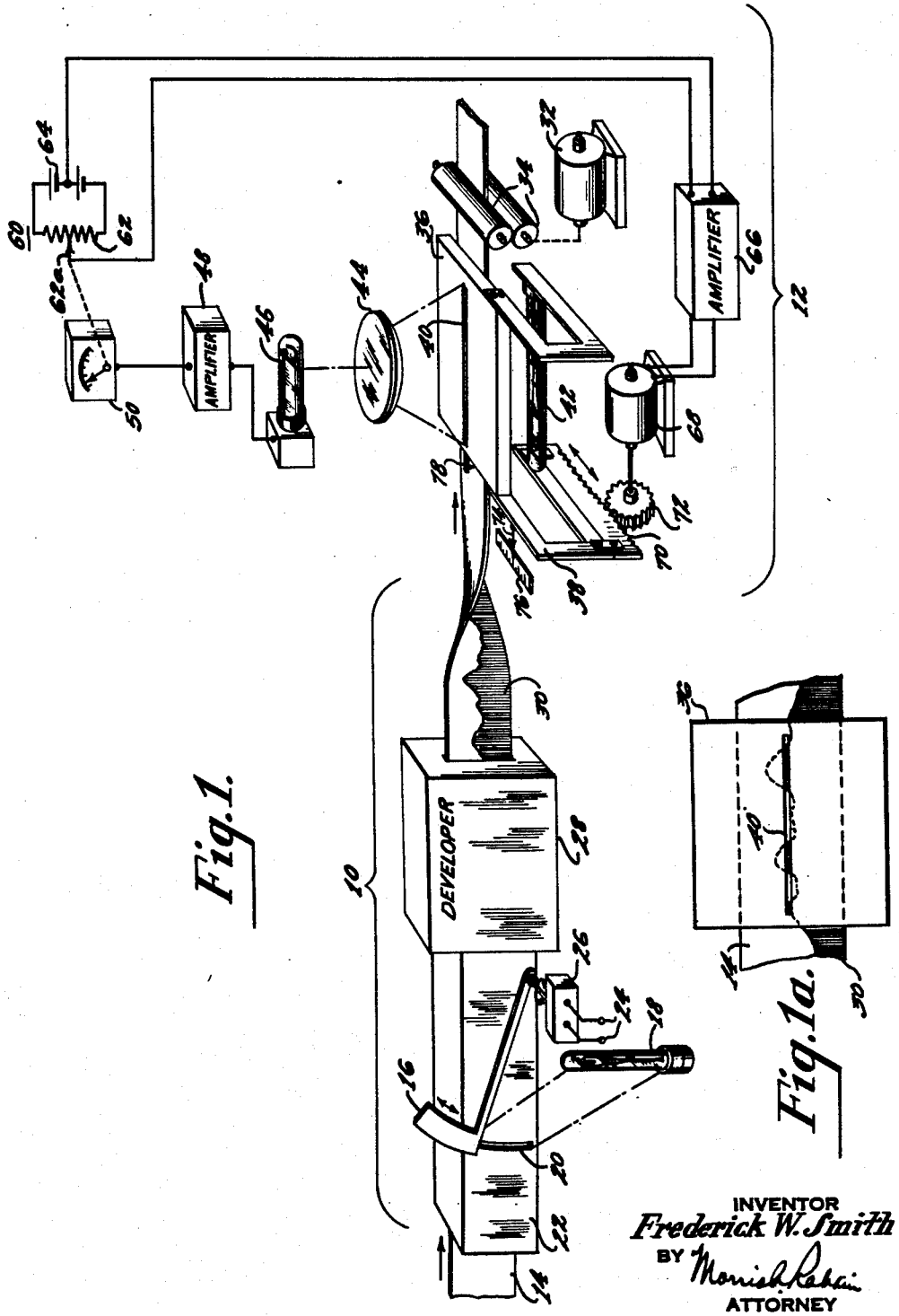
Figure 1 is a partially schematic and partially perspective view of a combined mechanical and electrical system for analyzing variable quantities in accordance with the invention.
Figure 1a is a plan view of a portion of the mechanical system of Figure 1, showing the apertured plate positioned over a portion of the film to permit 50 percent light transmission.

Referring particularly to Figure 1 of the drawing, it will be assumed that the apparatus shown therein is to be utilized for the measurement of median values of the field intensity of a radio wave.

The analyzer shown in Figure 1 consists essentially of two basic units; namely, a recorder 10 and a record evaluator 12.

The radio wave to be analyzed is recorded on a continuous photosensitive transparency or film 14 by means of a movable vane or shutter 16 arranged to intercept light from a source 18. Light passing the shutter 16 reaches the film 14 through a slot 20 in a light tight housing 22. The wave to be analyzed is received in the usual manner by conventional radio receiving apparatus (not shown). The resultant electrical signal from the receiver is applied to the input terminals 24 of a galvanometer movement 26 which controls the position of the movable shutter 16. It will, of course, be understood that the recording mechanism just described is intended to be illustrative only, and has been reduced to its simplest form for the sake of clarity. Examples of more conventional but more complex variable area recorders are given in the article "The ABC of photographic sound recording," Journal of the Society of Motion Picture Engineers, volume 44, No. 3 (March 1945), pages 151–194. Alternatively, a standard ink recorder can be utilized to provide a variable area record. The recording pen would be moved to and fro laterally on the recording paper, with the extent of lateral excursion being controlled by the received radio signal. Similarly, non-transparent photosensitive paper might be used. This would involve the use of apparatus similar to that shown in Fig. 1. As will appear more fully hereinafter all that is required is an elongated record element having different light affecting characteristics on the "recorded" and "unrecorded" portions thereof.

After the film 14 has been exposed in back of the slit 20, it is passed through a developer 28 wherein the exposure is brought out as a variable width opaque strip 30 on the film 14. It will be understood that the width of the strip 30 on the film 14 at any given point will be dependent on the intensity of the signal applied to the terminals 24 at the instant that point on the film was passing the slit 20 in the housing 22. Preferably, some means is provided for moving the film 14 through the apparatus at a constant rate as the signals to be recorded are received. For example, such means is illustrated as a motor 32 arranged to drive rollers 34 disposed on opposite sides of the film 14.

The evaluator 12 includes a plate 36 mounted above the film 14 on a carriage 38 which is arranged to move transversely with respect to the direction of motion of the film 14. A thin slit 40 is provided in the plate 36 parallel to the edges of the film 14, and a light source 42 of uniform light intensity output is mounted on the carriage 38 below the film 14. Accordingly, light from the source 42 will pass through the film 14, and the slit 40, in an amount determined by the opacity of that section of the film 14 passing beneath the slit 40 at any given instant. In effect, only a narrow section of the film, substantially equal in width to the width of the slit 40, will be scanned by the light from the source 42 at any given time.

A condensing lens 44 is disposed above the plate 36 to direct light from the slit 40 onto a photocell 46, wherein variations in the amount of light passing through the slit 40 are converted into variations in the amplitude of the photocell current. Preferably, the photocell output is amplified in a conventional direct current amplifier 48, and the output signal of the amplifier is applied to a meter 50 which is calibrated in terms of percentage of light transmission. The initial calibration of the meter 50 for 100 per cent transmission is made by placing beneath the slit 40 a section of clear or unexposed film.

To determine the median value of the recorded signal, the plate 36 is moved transversely over the segment of the film under consideration until the meter 50 indicates that 50 per cent light transmission is being obtained. The position of the slit 40 relative to the film 14, for median value, is shown in Figure 1a of the drawing. In Figure 1a, it can be seen that the slit 40 is positioned so that, considering the length of the film section beneath the slit 40, the opaque portion of the film extends laterally beyond the slit for one half of the length thereof. Accordingly, light can pass through the remaining half of the slit only. It is evident that the slit position which will give 50 per cent light transmission also will designate the median value for that portion of the film immediately beneath the slit.

In order to make the apparatus fully automatic so that the median of a variable area record can be determined continuously, a sensing device 60 preferably is coupled to the meter 50 to provide an error signal whenever the light transmission deviates from the 50 per cent point. Illustratively, the sensing device may comprise a so-called microtorque potentiometer 62 connected in parallel with a voltage source, such as a battery 64, with the potentiometer tap 62a being mechanically coupled to the movement of the meter 50. The output of the sensing device 60 is applied through an amplifier 66 to a drive motor or servomechanism 68, and the drive motor 68 is mechanically coupled to the carriage 38 through a rack 70 and gear 72. With such an arrangement, the output of the sensing device 60 will cause the rack 38 to move transversely with respect to the film 14. In turn, this motion of the rack will maintain constant light input or degree of light transmission to the photocell 46.

The median value of the recorded wave can be determined from an indicator 74 mounted on the carriage 38 to cooperate with a scale or index 76. Alternatively, a pen recorder 78 or similar scribing device can be mounted on the carriage 38 to place a continuous line on the film 14 to designate the median value of the signal recorded thereon.

Under some circumstances, as where the field intensities of radio waves are to be measured as functions of distance from the wave source rather than of time, the use of a combined recorder and evaluator is not convenient, and it is impractical to make the system continuous. However, the record obtained can be developed after a given field run is completed, and can be evaluated thereafter in the manner shown herein to provide the necessary information.

Thus, it can be seen that the apparatus of Figure 1 will provide a direct indication (or, if desired, a continuous record) of the median or other arbitrary percentage value of a variable quantity.

In Figure 2, there is shown an alternative form of variable area record evaluator embodying the principles of the invention. In Figure 2, the recording mechanism is not shown, it being assumed that a recorder similar to that shown in Figure 1 has been utilized to provide a variable area record on a film 14.

The evaluator shown in Figure 2 may be characterized as entirely electronic since no movable mechanical parts are required. In this case, the light source corresponding to the light source 42 in Figure 1 comprises a so-called "flying spot scanner." Such a scanner consists of a cathode ray tube 100 having the usual electron gun 102, pairs of horizontal and vertical deflecting plates, 104 and 106, respectively, and a fluorescent screen 112. Impingement of the cathode ray beam on the screen 112 will generate a spot of light at the point of impingement. The deflecting plates 104 and 106 are connected to horizontal and vertical deflection voltage generators 108 and 110, respectively, to deflect the beam in the tube 100 orthogonally in a multi-line pattern familiar to those skilled in the art. By passing the film 14 in front of the screen 112 of the tube 100, and arranging a photocell 46 to receive light passing from the screen 112 through the film 14, median or other arbitrary percentage values of the variable quantity recorded on the film 14 can be determined.

It can be seen that the output of the photocell 46 for each point scanned by the electron beam in the tube 100 will have one of two possible values, depending on whether or not the recorded pattern on the film 14 has intercepted the light from the tube screen 112 at that point. Consequently, as each line is scanned by the cathode ray beam, the photocell will provide a series of square pulses as shown in Figure 2a of the drawing. In practice, the photocell output may require amplification. Conventional amplifier systems are well known which will serve this purpose, and have been omitted for simplicity. If desired, a so-called electron multiplier, such as the type "931–A," can be used for the photocell 46.

In Fig. 2a, the four lines A, B, C, D correspond to the waveform of the output of the photocell during four horizontal scanning lines selected at random. During the first scan (line A in Fig. 2a) it is assumed that the photocell output voltage is constant; i. e. that the portion of film scanned intercepted none of the light. During the second scan (line B), the light was intercepted during three short intervals; less than half of the total scanning time. During the third scan (line C), the light wave was intercepted approximately half of the total scanning time, and during the fourth scan (line D), the light was intercepted during the major portion of the scanning time. In the illustrative example of Fig. 2a, the vertical position of the horizontal scan corresponding to line C would be at the median value of the recorded wave. Therefore, in order to determine the median or other arbitrary value of the recorded wave, it will be apparent that the photocell output for each line scanned must be evaluated to determine the relative total quantity of light represented by each series of pulses. For this purpose, there is provided in accordance with the invention a novel voltage-evaluating circuit from which an output will be obtained only when the input thereto comprises a series of pulses of predetermined total pulse-duration, neither more nor less. If, for any given line scanned, the input is found to correspond to the predetermined value, then it will be known that the median (or other selected value) lies along that line.

The circuit shown consists of an integration network 114 and a voltage selecting network 115. In the integration network, a voltage is developed which is proportional to the number and duration of the pulses received from the photocell during any given line scan of the cathode ray beam. In the voltage selecting network 115, the voltage developed by the integrator is utilized in a frequency-sensitive utilization system in a manner described hereinafter.

The integrator 114 comprises a triode tube 116, connected as a so-called cathode follower, wherein the cathode load network consists of a first resistor 118 shunted by a resistor-capacitor combination 120, 122. The operation of the integration amplifier 116 is such that the voltage across the capacitor 122 will be a function of the number and the duration of the positive pulses applied to the tube 116. Each time a positive pulse is applied to the tube 116, the cathode voltage thereof will increase, and the capacitor 122 will receive an increment of charge. The amount of charge received will be partly a function of the duration of the pulse. At the end of the pulse, the cathode voltage will drop and the capacitor 116 will begin to discharge. However, since the discharge path will include both of the resistors 118, 120, while the charging path includes only the resistor 118, the discharge time constant can be made large enough so that the loss of charge between pulses will be negligible.

At the end of each line scan of the cathode ray beam, the capacitor 122 must be discharged to prepare for the next pulse sequence. Accordingly, a tube 124 is connected in parallel with the capacitor 122. This tube 124 is operated in a manner described hereinafter to discharge the capacitor 122 shortly after the end of each line scan.

In the selector network 115, the voltage developed across the capacitor 122 is applied to the circuit of a so-called reactance tube 126 which controls the frequency of an oscillator 128. The reactance tube 126 is connected in shunt with the tuned circuit 130 of the oscillator 128. As is well known, in a frequency control system of this type, the reactance tube 126 is arranged to draw a reactive component of current, with the frequency of operation of the oscillator 128 being dependent on the amount of current drawn by the reactance tube. Thus, the operating frequency of the oscillator 128 will be a function of the voltage applied from the integrator 114 to the reactance tube 126.

The oscillator 128 is connected to a detector comprising a tuned circuit 132 and a diode tube 134 having a load circuit 136. The adjustment of the oscillator and of the tuned circuit 132 in the detector network are correlated that there will be no appreciable voltage across the load circuit 136 of the detector unless the control voltage applied to the reactance tube 126 causes the oscillator frequency to correspond exactly with that of the tuned detector circuit 132. That is, the predominant response of the detector will occur at one predetermined frequency.

The load circuit 136 of the detector is connected to the control grid 138 of a tube 140 which is normally biased beyond cut-off by a negative voltage from a source shown as a battery 142. Since the detector output voltage will be of polarity opposite to that of the bias battery 142, the bias voltage can be overcome by the detector output voltage if the latter is sufficiently large. Therefore, it can be seen that the tube 140 will be able to conduct current only when a predetermined total amount of light has impinged on the photocell 46 during one line scan. Also, it can be seen that the tube 140 can function as a "gate" circuit.

In order to test the conductivity of the tube 140 at the end of each line scan, the tube control grid 138 is connected through an inverter tube 144 to receive a small positive pulse from the horizontal deflection generator 108 at the end of each line scan. If, at the instant this positive pulse is received, the detector output voltage is sufficiently large to overcome the tube bias voltage, then the "gate" will be open and a negative pulse of voltage will be developed at the tube anode 146. Thereafter, it is only necessary to determine which line-scan corresponded to conduction in the tube 140 in order to determine the median value of the wave being analyzed.

A suitable indicator for this purpose comprises a cathode ray tube 148. The horizontal deflection plates 150 of the cathode ray tube 148 are connected to the anode of the selector tube 140, and the vertical deflection plates 152 are connected to the vertical deflection generator 110.

As the cathode ray beam in the scanning tube 100 is moved vertically, the beam in the indicator tube 148 will move vertically in synchronism therewith. If the pulse applied to the tube 140 is allowed to pass therethrough at the end of a particular line scan, then the beam in the indicator tube 148 will be deflected horizontally to provide a marker pip at a point corresponding to the particular line scan involved.

The positive pulse which is applied to the tube 140 also is utilized to control the discharge of the integration capacitor 122 at the end of each line scan. However, this discharge must be slightly delayed with respect to the operation of the tube 140. Consequently, the pulse from the inverter 144 preferably is applied to the discharge control tube 124 through a delay network 154, such as section of artificial transmission line or the like. This will allow the selector tube 140 to function before the capacitor 122 is discharged.

It is apparent that the voltage amplitude selector circuit just described can be used to monitor any unidirectional voltage source, and is not limited to use with a pulse integrating network such as the network 114.

From the foregoing, it can be seen that the present invention provides either an electro-mechanical or an electronic apparatus for evaluating a recorded wave in a simple and efficient manner.

It will, of course, be understood that the invention is not limited to the specific embodiments illustrated and described herein. For example, it has been indicated that the variable area record preferably comprises an opaque strip of variable width on a transparency or film. While this arrangement is deemed preferable for accurate results, either photosensitive paper or an ink recorder may be utilized, as previously mentioned, to record a variable width strip on opaque recording paper. If an opaque record is used, the light sensitive element 46 and the light source 42 or 100 in the evaluation apparatus of Fig. 1 or 2 would be set up on the same side of the record rather than on opposite sides thereof. Measurement then would be made of light reflected from the surface of the record rather than light transmitted through the record. That is, the differences in the light reflecting properties of the record would be relied on rather than differences in light transmitting properties. In either case, the amount of light received by the photocell will be a function of the relative light-absorbing effects of the record member and the record strip.

Again, in the apparatus of Fig. 2, the light source 100 could be replaced by a rotating mirror arranged to sweep a beam of light along the record.

Since these and similar changes could be made in the apparatus described without departing from the scope and spirit of the invention, the foregoing is to be construed as illustrative, and not in a limiting sense.

What is claimed is:

1. Apparatus for evaluating a variable quantity recorded on an elongated transparency as an opaque strip extending from one edge of said transparency, said strip varying in width as a function of variations in said quantity, said apparatus comprising a carriage, a plate mounted on said carriage and formed with an elongated slit therein, a source of light mounted on said carriage beneath said slit, means to move said transparency through said carriage between said light source and said plate in a direction parallel to the longitudinal axis of said slit, a light sensitive element disposed above said plate and positioned to receive light from said source passing through said transparency and said slit, means coupled to said light sensitive element to generate a control voltage of one polarity when the amount of light received by said element is greater than a predetermined amount, and a control voltage of an opposite polarity when the amount of light received by said element is less than said predetermined amount, means including a reversible motor mechanically coupled to said carriage and electrically coupled to said control voltage generating means to move said carriage transversely across said transparency in response to said control voltages, said predetermined amount of light having an intensity determined by the light transmitted through said slit and by the portions of the transparency directly beneath said slit unobstructed by said opaque strip.

2. Apparatus for evaluating a variable quantity as described in claim 1 characterized by the addition of an indicating means including a marker fixed to said carriage to indicate the distance of said slit from said edge of said transparency.

References Cited in the file of this patent

UNITED STATES PATENTS

| Number | Name | Date |
| --- | --- | --- |
| 2,098,326 | Wente | Nov. 9, 1937 |
| 2,201,978 | Bedford | May 28, 1940 |
| 2,209,220 | Berry | July 23, 1940 |
| 2,213,534 | Rowe | Sept. 3, 1940 |
| 2,259,287 | Bendy | Oct. 14, 1941 |
| 2,262,354 | Cates | Nov. 11, 1941 |
| 2,298,407 | Miller | Oct. 13, 1942 |
| 2,312,182 | Meyer | Feb. 23, 1943 |
| 2,356,567 | Cockrell | Aug. 22, 1944 |
| 2,386,320 | Kott | Oct. 9, 1945 |
| 2,415,591 | Henroteau | Feb. 11, 1947 |
| 2,455,532 | Sunstein | Dec. 7, 1948 |
| 2,467,812 | Clapp | Apr. 19, 1949 |
| 2,474,192 | Schlesman | June 21, 1949 |
| 2,494,441 | Hillier | Jan. 10, 1950 |
| 2,510,347 | Perkins | June 6, 1950 |
| 2,532,964 | Taylor et al. | Dec. 5, 1950 |
| 2,548,590 | Cook | Apr. 12, 1951 |